United States Patent
Kim et al.

(10) Patent No.: US 6,400,952 B2
(45) Date of Patent: Jun. 4, 2002

(54) METHOD AND APPARATUS FOR IDLE HANDOFF IN A CELLULAR SYSTEM

(75) Inventors: Sang-tae Kim; Young-sik Lim, both of Seoungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/391,730

(22) Filed: Sep. 8, 1999

(30) Foreign Application Priority Data

Sep. 8, 1998 (KR) ............................................ 98-36976

(51) Int. Cl.[7] ................................................ H04Q 7/20
(52) U.S. Cl. ...................... 455/436; 455/422; 455/439; 455/513
(58) Field of Search ................................ 455/422, 436, 455/437, 439, 442, 525, 513; 370/331, 350, 328, 335

(56) References Cited

U.S. PATENT DOCUMENTS

| | | | | |
|---|---|---|---|---|
| 5,101,101 A | * | 3/1992 | Sawamura | 250/223 |
| 5,267,261 A | * | 11/1993 | Blakeney, II et al. | 375/200 |
| 5,794,149 A | * | 8/1998 | Hoo | 455/438 |
| 5,828,662 A | * | 10/1998 | Jalali et al. | 370/335 |
| 5,920,549 A | * | 7/1999 | Bruckert et al. | 370/331 |
| 5,940,743 A | * | 8/1999 | Sunay et al. | 455/69 |
| 5,940,762 A | * | 8/1999 | Lee et al. | 455/442 |
| 5,946,612 A | * | 8/1999 | Johansson | 455/405 |
| 5,966,402 A | * | 10/1999 | Yamamoto | 375/200 |
| 5,982,759 A | * | 11/1999 | Jo et al. | 370/331 |
| 5,999,816 A | * | 12/1999 | Tiedemann, Jr. et al. | 455/437 |
| 6,049,716 A | * | 4/2000 | Jung | 455/442 |
| 6,061,337 A | * | 5/2000 | Light et al. | 370/331 |
| 6,070,075 A | * | 5/2000 | Kim | 455/437 |
| 6,078,570 A | * | 6/2000 | Czaja et al. | 370/331 |
| 6,101,175 A | * | 8/2000 | Schorman et al. | 370/331 |
| 6,175,734 B1 | * | 1/2001 | Desgagne et al. | 455/437 |
| 6,181,943 B1 | * | 1/2001 | Kuo et al. | 455/437 |

* cited by examiner

Primary Examiner—William Trost
Assistant Examiner—Congvan Tran
(74) Attorney, Agent, or Firm—Klauber & Jackson (57) ABSTRACT

Method and apparatus for an idle state handoff in a cellular system includes the steps of transmitting by a current base station to a mobile telephone information regarding a frequency assignment of the neighboring base stations and a list of the neighboring base stations. A pilot signal is detected from the neighboring base stations by the mobile telephone, and it is then determined whether the detected neighboring base station is included in the list of the neighboring base stations. If the detected neighboring base station is not included in the list, it recognized as a handoff failure. If the detected neighboring base station is included in the list of the neighboring base stations, a determination as to whether the detected pilot signal is a dummy pilot signal by referring to the frequency assignment information. A frequency corresponding to the neighboring base station must be determined if the pilot signal is a dummy signal in order to perform the idle state handoff. Detection of the paging channel from the decided handoff frequency is performed. An apparatus of the present invention includes a mobile telephone for detecting pilot signals of the neighboring base stations and for deciding the frequency for handoff by referencing a list of the neighboring base stations and the frequency assignment information supplied by the current base station. The mobile telephone is switched in an idle state from the current base station to a neighboring base station having a decided handoff frequency.

19 Claims, 4 Drawing Sheets

METHOD AND APPARATUS FOR IDLE HANDOFF IN A CELLULAR SYSTEM

CLAIM OF PRIORITY

This application makes reference to, incorporates the same herein, and claims all benefits accruing under 35 U.S.C. § 119 arising from an application entitled, METHOD AND APPARATUS FOR IDLE HANDOFF IN A CELLULAR YSTEM, earlier filed in the Korean Industrial Property Office on Sep. 9, 1998, and there duly assigned Ser. No. 1998-36976.

FIELD OF INVENTION

The current invention relates to a method for executing an idle handoff in a cellular system and an apparatus thereof. More particularly, a method for executing a hard handoff when a mobile telephone in an idle state moves between base stations having other frequency assignments (FA) in a conventional code division multiple access (CDMA) system and an apparatus thereof.

DESCRIPTION OF THE RELATED ART

In a cellular system, there are a plurality of cells within a service area, a plurality of base stations for controlling the cells, and a mobile switching center for controlling the base stations. When a mobile telephone moves between cells, it is possible to maintain the continuity of the transmission traffic by using a handoff function.

A handoff function permits a mobile telephone to continue transmission over a channel to a current base station as the mobile telephone moves into another base station's coverage region.

Figure 1:
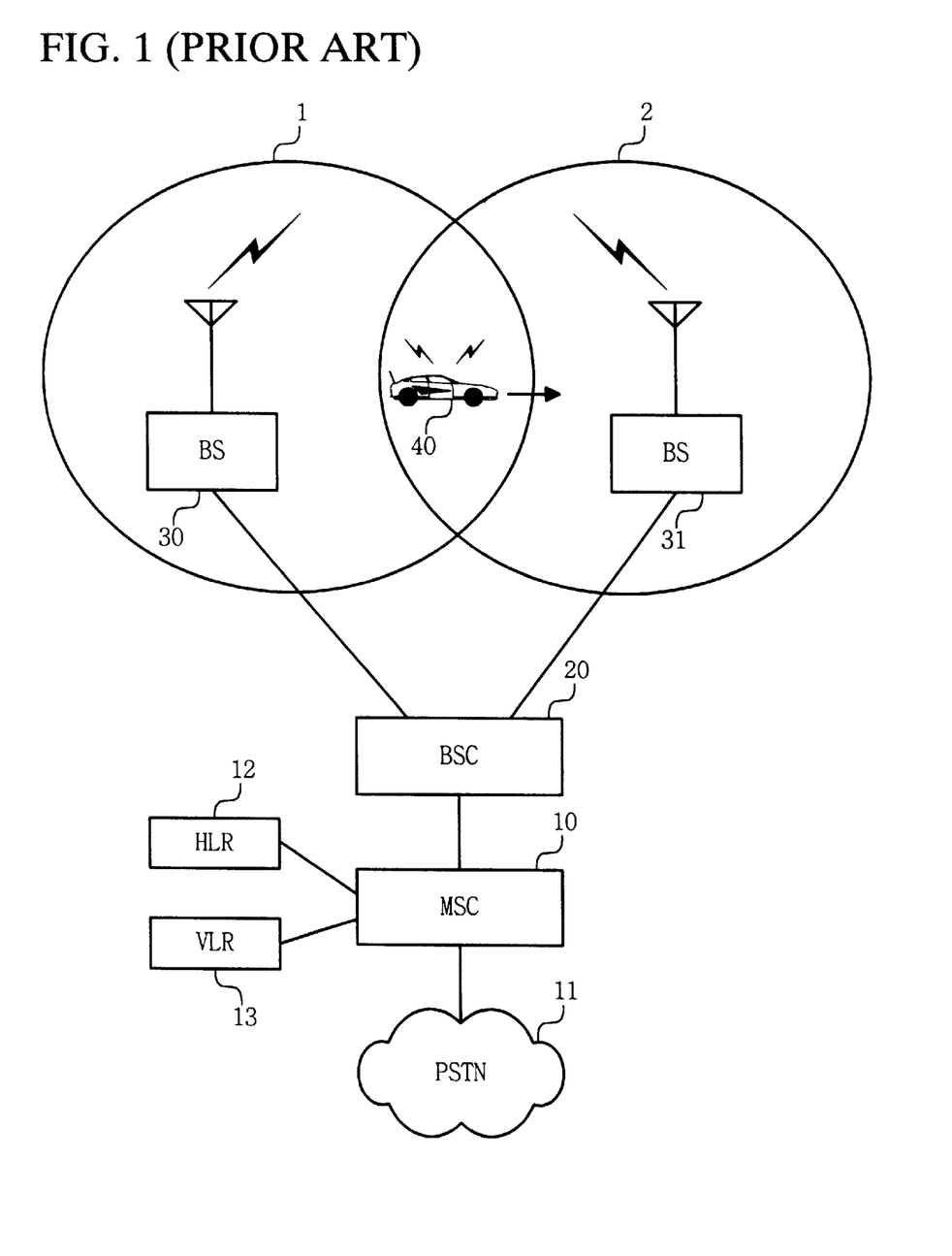
FIG. 1 illustrates a conventional cellular system using the CDMA technology.

FIG. 1 depicts a conventional cellular system using the CDMA technology. As shown in FIG. 1, a conventional cellular system comprises a mobile telephone (MT) 40 for providing call service to user, a base transceiver station (BTS) 30, 31 for providing service to the mobile telephone, a base station controller (BSC) 20 for controlling the BTS, and a mobile switching center (MSC) 10 for connecting between the BSC and a public switched telephone network (PSTN) 11. The MSC 10 receives information on the user from a home location resistor (HLR) 12 and visitor location resistor (VLR) 13.

During an idle state, a mobile telephone monitors the strength of the paging channels transmitted from different base stations.

A mobile telephone receives a message by using one of the paging channels when either receiving an incoming call or initializing an outgoing call. The mobile telephone monitors the various paging channels when moving from a coverage area of a current base station to another coverage area of a neighboring base station. This function for monitoring the paging channels is referred to as an idle handoff.

In a CDMA system, each of the channels transmitted from a base station has a same pseudo-random noise (PN) sequence offset value, which is called a pilot signal, so that the base station is identified by the PN signal. Accordingly, a mobile telephone identifies each of the base stations from the different pilot signals.

A mobile telephone monitors the pilot signal having the strongest intensity from all of the neighboring base stations. When the strength of pilot signal monitored from one of the neighboring base stations is stronger, over a predetermined value (for example, 3 dB), than the strength of the pilot signal of the current base station which is connected to the mobile telephone via the paging channel, the mobile telephone executes the idle handoff at the frequency of the monitored pilot signal and recognizes itself as entering into the new base station.

In a CDMA system, the number of frequency assignments (FA) assigned to a base station is increased as the demand for increased capacity grows.

When a mobile telephone moves from a first base station having a specific channel with a channel frequency into a neighboring base station, which does not have call service at the specific channel frequency of the first base station, or into a neighboring base station which does not have an available channel at the specified channel frequency, a hard handoff is executed. The hard handoff process first cuts off the channel connected between the mobile telephone and base station and makes a new channel connection within a short time in an attempt to prevent a user from recognizing that the hard handoff has occurred.

Although not providing call service at the specified channel frequency, the neighboring base station transmits a dummy pilot signal to the mobile telephone on the specified channel frequency in order to make it possible for the mobile telephone to receive pilot signals at its current specified frequency. Therefore, the mobile telephone can recognize that it has entered into a new coverage area of another base station as soon as it detects a dummy pilot signal.

The current base station, to which the mobile telephone is connected, transmits information on the neighboring base stations to the mobile telephone through a paging channel. This information is called an extended neighbor list.

If the mobile telephone detects a pilot signal from a new base station, and the detected new base station is included in an extended neighbor list, the mobile telephone executes the idle handoff to the new base station. If the new base station is not included in the list, the mobile telephone does not execute the idle handoff.

In FIG. 1, a base station 30 provides call service to a first cell 1, which has two frequency assignments (1FA, 2FA), and is connected to a mobile telephone with a paging channel at the 2FA frequency. A neighboring base station 31 provides call service to a second cell 2 at a frequency assignment (1FA), and the neighboring base station 31 uses the frequency assignment at 2FA for a dummy pilot signal.

As the mobile telephone, which monitors the 2FA frequency paging channel, moves from cell 1 to cell 2, the mobile telephone receives the 2FA dummy pilot signal from the base station 31; this reception indicates that the mobile telephone has entered into the transmission area of cell 2. The mobile telephone subsequently monitors the paging channel of the base station 31 with at the 2FA dummy pilot signal at first and thereafter monitors a paging channel of the base station 31 at the 1 FA frequency so that both an inter-cell handoff (from cell 1 to cell 2), and an inter-frequency handoff (from frequency 2FA to 1 FA) can occur.

As described above, the prior art idle handoff method has some complexities owing to executing two step handoff process including (1) an inter-cell handoff and (2) an inter-frequency handoff within the new cell. Moreover, if a call from a base station or initiated by the mobile telephone user occurs before the inter-cell handoff and inter-frequency handoff are finished, it is impossible to set up the call properly.

SUMMARY OF THE INVENTION

It is an object of the current invention to provide an idle state handoff method and a handoff apparatus for a mobile station, which performs a handoff between base stations having different frequency assignments in a cellular system. If a mobile telephone, in an idle state, detects the pseudo pilot signal of the neighboring base stations, then the handoff is directly performed with the frequency provided by the neighboring base stations.

It is another object of the current invention to provide an idle state handoff method and a handoff apparatus for a mobile station in a cellular system, which continuously transmits information to the mobile telephones about the channels and the frequencies of the neighboring base stations.

According to a first preferred embodiment of the present invention, a method for an idle state handoff between base stations having different frequency assignments in a cellular system, the method comprising the steps of:

(a) transmitting information by the current base station to a mobile telephone regarding a frequency assignment of each of a plurality of neighboring base stations and a list of the neighboring base stations building up a channel with the mobile telephone;

(b) detecting a pilot signal from one of the plurality of neighboring base station by the mobile telephone;

(c) determining whether the pilot signal detected from the one of the neighboring base stations is included in the received list of the neighboring base stations;

(d) recognizing that a handoff has failed if the neighboring base station from which the pilot signal is detected is not included in the list of the neighboring base stations;

(e) determining whether a detected pilot signal is a dummy pilot signal by referring to the frequency assignment information, if the detected neighboring base station is included in the list of the neighboring base stations;

(f) deciding a frequency which corresponds to the one neighboring base station to perform a handoff based on the frequency assignment information, if the detected pilot signal is a dummy pilot signal; and (g) detecting a paging channel from the decided handoff frequency.

In the above embodiment, it is preferable that the information regarding the frequency assignment of the neighboring base stations be transmitted by the current base station includes an index of a pilot pseudo-random noise offset (PILOT_PN), a configuration state of the frequency assignment of the neighboring base station (NGHBR_CONFIG), a frequency indicator to indicate whether a frequency of the mobile telephone connected to the current base station is a dummy pilot signal in the neighboring base station (FREQ_INCL), a frequency band of the frequency assignment (NGHBR_BAND), and an assigned frequency of the frequency assignment (NGHBR_FREQ).

It is preferable that the strength of the detected pilot signal from the neighboring base station is stronger than a pilot signal of the current base station by a predetermined value.

It is also preferable that if the detected pilot signal is not a dummy pilot signal, a step of detecting a paging channel in the present frequency of the neighboring base station.

According to a second preferred embodiment of the present invention, a method for an idle state handoff between base stations having different frequency assignments in a cellular system comprising the steps of:

(a) detecting a new pilot signal from a neighboring base station by a mobile telephone;

(b) determining whether the detected pilot signal is a pilot signal from the neighboring base station;

(c) determining whether the detected pilot signal from the neighboring base station is a dummy pilot signal; and (i) if it has been determined in step (c) that the detected pilot signal is a dummy pilot signal, deciding a handoff frequency corresponding to the detected neighboring base station and executing a handoff in an idle state at the decided handoff frequency; or (ii) if it has been determined in step (c) that the detected pilot signal is not a dummy pilot signal, executing an idle state handoff to the neighboring base station at a present frequency.

In the above embodiment, it is preferable that the strength of the detected pilot signal from the neighboring base station is stronger than a pilot signal of the current base station by a predetermined value.

It is also preferable that the above embodiment further includes a step of transmitting by the current base station to a mobile telephone information on a frequency assignment of the neighboring base stations and a list of the neighboring base stations building up a channel with the mobile telephone.

It is preferable that the information on the frequency assignment of the neighboring base station transmitted by the current base station includes an index of pilot pseudo-random noise offset (PILOT_PN), a configuration state of the frequency assignment of the neighboring base station (NGHBR_CONFIG), a frequency indicator to indicate whether a frequency of the mobile telephone connected to the current base station is a dummy pilot signal in the neighboring base station (FREQ_INCL), a frequency band of the frequency assignment (NGHBR_BAND), and an assigned frequency of the frequency assignment (NGHBR_FREQ).

According to a third preferred embodiment of the current invention, a method for idle an idle state handoff in a cellular system comprising the steps of:

(a) detecting by a mobile telephone of a plurality of pilot signals being transmitted from a current base station and from neighboring base stations while the mobile telephone is an idle state;

(b) checking whether one of the detected pilot signals is included in a list of extended neighboring base station including information on a frequency assignment of the neighboring base stations; and (b) (i) terminating the handoff if the detected pilot signal checked in step (b) is not included in the list of extended neighboring base stations; or (b) (ii) determining whether the detected pilot signal is a dummy pilot signal if the detected pilot signal checked in step (b) is included in the list of extended neighboring base stations; and (b) (iii) recognizing a handoff failure if the detected pilot signal is not included in the list of extended neighboring base stations as determined in step (ii);

(b) (iv) performing an inter-cell handoff at a frequency of the detected pilot signal if the detected pilot signal is not a dummy pilot signal as determined in step (ii);or (b) (v) determining a handoff frequency with reference to the extended neighboring list, performing an inter-cell and an inter-frequency handoff at the determined handoff frequency, and monitoring a paging channel if the detected pilot signal is a dummy pilot signal as determined in step (ii).

According to a fourth embodiment of the present invention, an apparatus for an idle state handoff between base stations having different frequency assignments in a cellular system comprises:

a mobile telephone for detecting pilot signals transmitted from a plurality of neighboring base stations;

means for deciding a frequency by the mobile telephone for the idle state handoff from a list of the plurality of neighboring base stations and information regarding a frequency assignment of each one of the neighboring base stations; means for performing an idle state handoff by the mobile telephone at the decided frequency; and means for sending to a base station by the mobile telephone the list of the neighboring base stations and information regarding the frequency assignment of the neighboring base stations.

In the above embodiment, it is preferable that the information on the frequency assignment of the neighboring base station transmitted by the current base station includes an index of the pilot pseudo-random noise offset (PILOT_PN), a configuration state of the frequency assignment of the neighboring base station (NGHBR_CONFIG), a frequency indicator to indicate whether a frequency of the mobile telephone connected to the current base station is a dummy pilot signal in the neighboring base station (FREQ_INCL), a frequency band of the frequency assignment (NGHBR_BAND), and an assigned frequency of the frequency assignment (NGHBR_FREQ).

It is preferable that the strength of the detected pilot signal from the neighboring base station is stronger than a pilot signal of the current base station by a predetermined value.

DESCRIPTION OF THE PREFERRED EMBODIMENTS

Figure 2:
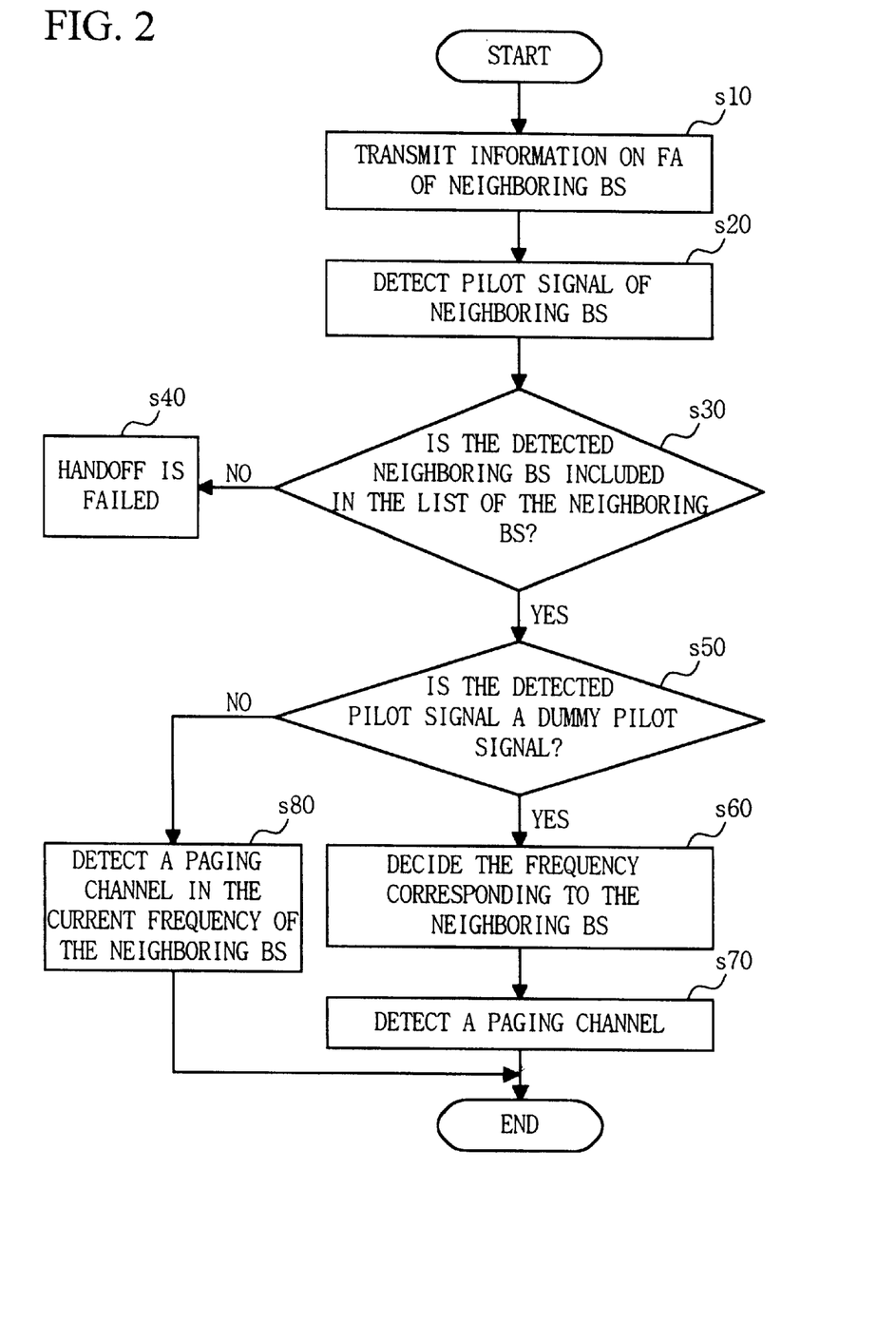
FIG. 2 is a flow chart for illustrating a first preferred embodiment of an idle handoff method in a cellular system according to the current invention.

FIG. 2 illustrates a flow chart of a first embodiment of an idle state handoff method according to the current invention.

According to the preferred embodiment of a method for idle handoff between base stations having different frequency assignments in a cellular system as shown in FIG. 2.

At step s10, information on a frequency assignment of the neighboring base stations and a list of the neighboring base stations is transmitted by the current base station to a mobile telephone over a current channel of the mobile telephone.

At step s20, the mobile telephone detects a pilot signal from one of the neighboring base stations.

At step s30, the mobile telephone determines whether the detected neighboring base station is included in the list of the neighboring base stations.

If the detected neighboring base station is not included in the list of the neighboring base stations checked in step s30, then at step s40, the mobile recognizes the handoff as failed.

If the detected neighboring base station is included in the list of the neighboring base stations checked in step s30, then at step s50, the mobile telephone determines whether the detected pilot signal is a dummy pilot signal referring to the frequency assignment information.

At step s60, the mobile telephone decides the frequency corresponding to the neighboring base station to perform a handoff based on the frequency assignment information if the detected pilot signal is a dummy pilot signal as determined in step s50 and at step s70, detects a paging channel from the decided handoff frequency; or At step s80 the mobile telephone detects a paging channel in the current frequency of the neighboring base station if the detected pilot signal is not a dummy pilot signal as determined in step s50.

In the above embodiment, it is preferable that the information on the frequency assignment of the neighboring base station transmitted by the current base station includes an index of pilot pseudo-random noise offset (PILOT_PN), a configuration state of the frequency assignment of the neighboring base station (NGHBR_CONFIG), a frequency indicator to indicate whether a frequency of the mobile telephone connected to the current base station is a dummy pilot signal in the neighboring base station (FREQ_INCL), a frequency band of the frequency assignment (NGHBR_BAND), and an assigned frequency of the frequency assignment (NGHBR_FREQ).

It is preferable that the method further comprises a step(s80) of detecting a paging channel from the current frequency of the neighboring base station if the detected pilot signal is not a dummy pilot signal (s70).

It is also preferable that the strength of the detected pilot signal from the neighboring base station is stronger than a pilot signal of the current base station by a predetermined value.

Figure 3:
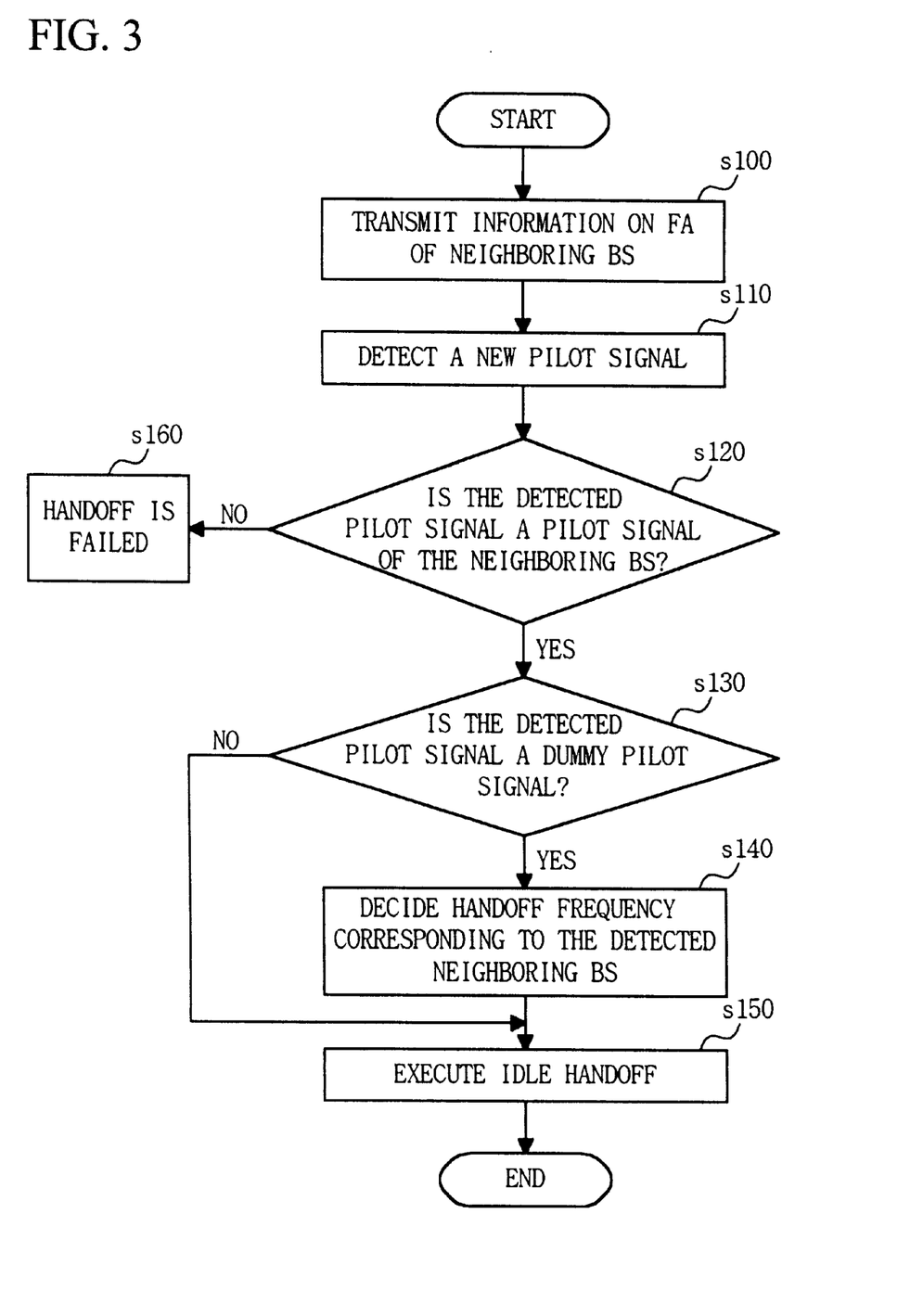
FIG. 3 is a flow chart for illustrating a second preferred embodiment of an idle handoff method in a cellular system according to the current invention.

FIG. 3 illustrates a flowchart for a second preferred embodiment of a method for an idle state handoff between base stations having different frequency assignments in a cellular system according to the present invention.

At step s100, information regarding a frequency assignment of a neighboring base station is transmitted to a mobile telephone.

At step s110, the mobile telephone detects a new pilot signal from a neighboring base station.

At step 120, the mobile telephone determines whether the detected pilot signal is a pilot signal of the neighboring base station for which information was transmitted at step s100.

At step 130, it is determined whether the detected pilot signal from step s120 is a dummy pilot signal if the detected pilot signal is a pilot signal of the neighboring base station.

If the detected pilot signal at step 130 is determined not to be a dummy pilot signal, then at step s150 the idle state handoff is executed at the frequency of the detected pilot signal.

However, if the detected pilot signal at step 130 is determined to be a dummy pilot signal, at step s140 the mobile telephone decides a handoff frequency corresponding to the detected neighboring base station and then at step s150 an idle state handoff is executed at the decided handoff frequency.

In the above embodiment, it is preferable that the strength of the detected pilot signal from the neighboring base station is stronger than a pilot signal of the current base station by a predetermined value.

Although it is also preferable that the above embodiment further includes a step of transmitting to a mobile telephone information regarding a frequency assignment of the neighboring base stations and a list of the neighboring base stations by the current base station having a channel connected to the mobile telephone (step s100), this step is not necessary to perform the above embodiment.

It is preferable that the information on the frequency assignment of the neighboring base station transmitted by the current base station includes an index of pilot pseudo-random noise offset (PILOT$_{13}$ PN), a configuration state of the frequency assignment of the neighbor base station (NGHBR_CONFIG), a frequency indicator to indicate whether a frequency of the mobile telephone connected to the current base station is a dummy pilot signal in the neighbor base station (FREQ_INCL), a frequency band of the frequency assignment (NGHBR_BAND), and an assigned frequency of the frequency assignment (NGHBR_FREQ).

Figure 4:
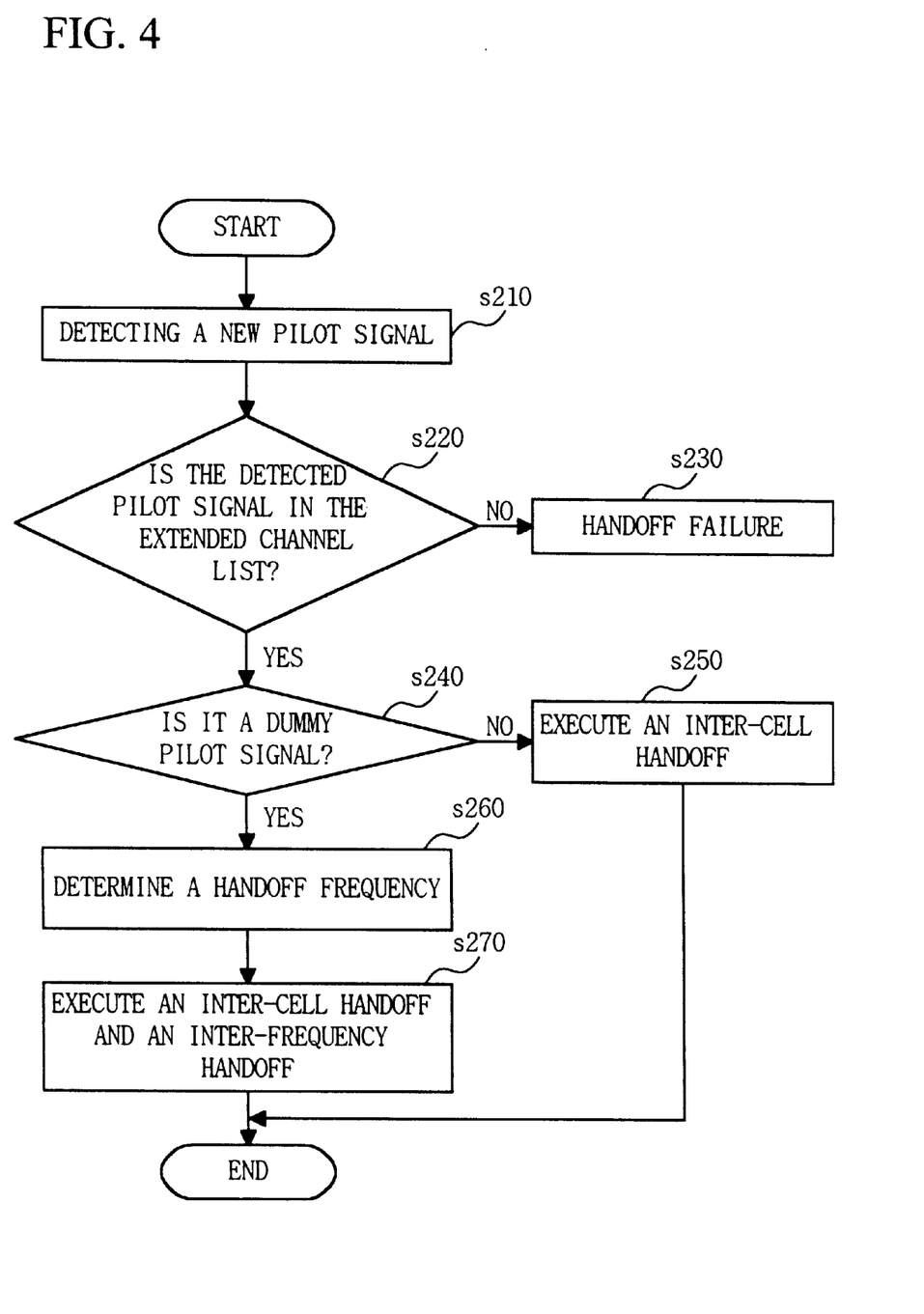
FIG. 4 is a flow chart for illustrating a third preferred embodiment of an idle handoff method in a cellular system according to the current invention.

FIG. 4 illustrates a third preferred embodiment of the present invention for an idle state handoff method.

At step 210, a mobile telephone in an idle state detects the pilot signals of the current base station and of the neighboring base stations.

At step s220, it is determined whether the detected pilot signal is included in an extended channel list of neighboring base stations. If the detected pilot signal is not in the extended list, the handoff is recognized as a failure at step s230.

At step s220, the mobile telephone also checks information about the detected pilot regarding a frequency assignment of the neighboring base stations and a list of the neighboring base stations. The list of extended neighboring base stations is saved in the mobile telephone.

If the detected pilot signal is included in the list, at step s240 the mobile telephone checks whether the detected pilot signal is a dummy pilot signal.

If it has been determined at step s240 that the detected pilot signal is not a dummy pilot signal, the mobile telephone executes an inter-cell handoff at a frequency of the received pilot signal at step s250.

If it has been determined at step s240 that the detected pilot signal is a dummy pilot signal, the mobile telephone decides a handoff frequency by referring to the extended neighboring list at step s260.

At step s270, after deciding the handoff frequency, the mobile telephone executes the inter-cell inter-frequency handoff and monitors a paging channel at the handoff frequency.

As described in the above embodiment illustrated in FIG. 4, a direct monitoring a paging channel of the neighboring base station using the handoff frequency can be achieved.

The information on the neighboring base stations received from the current base station is shown in Table 1.

TABLE 1

| FIELDS | LENGTH (BITS) | EXAMPLE |
|---|---|---|
| PILOT_PN | 9 | 472 |
| NGHBR_CONFIG | 3 | 2 |
| FREQ_INCL | 1 | 1 |
| NGHBR_BAND | 0 OR 5 | 1 |
| NGHBR_FREQ | 0 OR 11 | 300 |

The PILOT_PN is an index of pilot pseudo-random noise offset used in a cellular system and the NGHBR_CONFIG, frequency configuration, indicates a state of a frequency assignment of the neighboring base station.

For example, if the value of the NGHBR_CONFIG is 000, the mobile telephone recognizes the number of the frequency assignments between the current base station and the neighboring base station and if the value is 010, the mobile telephone recognizes the number is different.

The FREQ_INCL, frequency indicator, indicates a frequency connected to the mobile telephone with the current base station is a dummy pilot signal in the neighboring base station.

The NGHBR_BAND and the NGHBR_FREQ indicate information on the frequency to be synchronized by the mobile telephone.

As illustrated in the above table, the current invention is capable to provide a method and an apparatus for directly synchronizing with a new frequency with reference to the frequency information received from the neighboring base station when a mobile telephone detects a pilot signal having a stronger strength than a pilot signal received from the current base station.

In the present invention only executing an inter-frequency handoff finishes the idle state handoff. Therefore it is not necessary for a mobile telephone to execute an inter-frequency handoff in a cell and an inter-cell handoff. As a result, the problem of call failure because a call from a base station or user occurs before the inter-cell handoff and inter-frequency handoff are completed is eliminated. So, the call success rate in a cellular system is greatly increased.

FIG. 1 depicts a sketch of an apparatus of the preferred embodiment of an apparatus for idle state handoff between base stations having different frequency assignments in a cellular system, according to the present invention. The functions of the components are different from the prior art and are expressed below in means plus function that a person of ordinary skill in the art would readily understand.

An apparatus of the preferred embodiment includes a mobile telephone (40) for detecting pilot signals of the neighboring base stations (31). The mobile telephone comprises means for detecting pilot signals from the neighboring base stations; means for the current base station (30) to send to the mobile telephone information regarding the frequency assignment of the neighboring base stations and a list of the neighboring base stations; means for deciding a frequency of an idle state handoff from among the detected pilot signals whereby the mobile telephone references the list of the neighboring base stations and the information regarding the frequency assignment of the pilot signals of each of the neighboring base stations; and means for directly performing an idle state handoff at the decided frequency.

In the above embodiment, it is preferable that the information on the frequency assignment of the neighboring base station which is transmitted by the current base station includes an index of the pilot pseudo-random noise offset (PILOT_PN), a configuration state of the frequency assignment of the neighboring base station (NGHBR_CONFIG), a frequency indicator to indicate whether a frequency of the mobile telephone connected to the current base station is a dummy pilot signal in the neighboring base station (FREQ_INCL), a frequency band of the frequency assignment (NGHBR_BAND), and an assigned frequency of the frequency assignment (NGHBR_FREQ).

It is preferable that the strength of the detected pilot signal from the neighboring base station (31) is stronger than a pilot signal of the current base station (30) by a predetermined value.

What is claimed is:

1. A method for an idle state handoff of a mobile telephone between base stations having different frequency assignments in a cellular system, said method comprising the steps of:

(a) transmitting information by a current base station to said mobile telephone regarding a frequency assignment of each of a plurality of neighboring base stations and a list of the neighboring base stations having a channel connected to said mobile telephone;

(b) detecting a pilot signal from one of said plurality of neighboring base station by said mobile telephone;

(c) determining whether the pilot signal detected from said one of said neighboring base stations is included in the list of said neighboring base stations;

(d) recognizing that a handoff has failed if said neighboring base station from which said pilot signal is detected is not included in the list of said neighboring base stations;

(e) determining whether a detected pilot signal is a dummy pilot signal by referring to the frequency assignment information if said detected neighboring base station is included in the list of said neighboring base stations;

(f) deciding a frequency which corresponds to said detected neighboring base station to perform a handoff based on the frequency assignment information, if the detected pilot signal is a dummy pilot signal; and (g) detecting a paging channel from the decided handoff frequency.

2. The method as set forth in claim 1, wherein the information regarding the frequency assignment of the plurality of neighboring base stations transmitted by the current base station includes an index of pilot pseudo-random noise offset (PILOT_PN) used in said cellular system, a configuration state of the frequency assignment of the neighboring base station (NGHBR_CONFIG) for indicating a state of the frequency assignment of the neighboring base stations, a frequency indicator to indicate whether a frequency of said mobile telephone connected to the current base station is a dummy pilot signal (FREQ_INCL), a frequency band of the frequency assignment (NGHBR_BAND), and an assigned frequency of the frequency assignment (NGHBR_FREQ) for indicating information on the frequency assignment being synchronized by said mobile telephone.

3. A method as set forth in claim 1, wherein a strength of said detected pilot signal from said detected neighboring base station is stronger than a pilot signal of the current base station by a predetermined value.

4. The method as set forth in claim 2, wherein a strength of said detected pilot signal from said detected neighboring base station is stronger than a pilot signal of the current base station by a predetermined value.

5. The method as set forth in claim 1, wherein if said detected pilot signal is not a dummy pilot signal, said method further comprises a step of detecting a paging channel in the current frequency of said detected neighboring base station.

6. A method for an idle state handoff between base stations having different frequency assignments in a cellular system, said method comprising the steps of:

(a) transmitting to a mobile telephone a frequency assignment information of a neighboring base station and a list of the neighboring base stations by a current base station connected with the mobile telephone;

(b) detecting a new pilot signal from a neighboring base station by a mobile telephone;

(c) determining whether said detected pilot signal is a pilot signal from the neighboring base station;

(d) determining whether said detected pilot signal from the neighboring base station is a dummy pilot signal; and (e) if it has been determined in step (d) that said detected pilot signal is a dummy pilot signal, deciding a handoff frequency corresponding to said detected neighboring base station and executing a handoff in an idle state at said decided handoff frequency; or (f) if it has been determined in step (d) that said detected pilot signal is not a dummy pilot signal, executing an idle state handoff to said detected neighboring base station at a present frequency.

7. The method as set forth in claim 6, wherein a strength of said detected pilot signal from said detected neighboring base station is stronger than a pilot signal of a current base station by a predetermined value.

8. The method as set forth in claim 7, wherein said method further includes a step of transmitting to a mobile telephone information on a frequency assignment of the neighboring base stations and a list of the neighboring base stations by the current base station having a channel connected to said mobile telephone.

9. The method as set forth in claim 6, wherein the information regarding the frequency assignment of the plurality of neighboring base stations transmitted by the current base station includes an index of pilot pseudo-random noise offset (PILOT_PN) used in said cellular system, a configuration state of the frequency assignment of the neighboring base station (NGHBR_CONFIG) for indicating a state of the frequency assignment of the neighboring base stations, a frequency indicator to indicate whether a frequency of said mobile telephone connected to the current base station is a dummy pilot signal (FREQ_INCL), a frequency band of the frequency assignment (NGHBR_BAND), and an assigned frequency of the frequency assignment (NGHBR_FREQ) for indicating information on the frequency assignment being synchronized by said mobile telephone.

10. The method as set forth in claim 7, wherein the information regarding the frequency assignment of the plurality of neighboring base stations transmitted by the current base station includes an index of pilot pseudo-random noise offset (PILOT_PN) used in said cellular system, a configuration state of the frequency assignment of the neighboring base station (NGHBR_CONFIG) for indicating a state of the frequency assignment of the neighboring base stations, a frequency indicator to indicate whether a frequency of said mobile telephone connected to the current base station is a dummy pilot signal (FREQ_INCL), a frequency band of the frequency assignment (NGHBR_BAND), and an assigned frequency of the frequency assignment (NGHBR_FREQ) for indicating information on the frequency assignment being synchronized by said mobile telephone.

11. A method for idle handoff in a cellular system comprising the steps of:

(a) detecting by a mobile telephone of a plurality of pilot signals being transmitted from a current base station and from neighboring base stations while said mobile telephone is an idle state;

(b) checking whether one of said detected pilot signals is included in a list of extended neighboring base stations including information on a frequency assignment of the neighboring base stations; and (b) (i) terminating the handoff if said detected pilot signal checked in step (b) is not included in the list of extended neighboring base stations; or (b) (ii) determining whether said detected pilot signal is a dummy pilot signal if said detected pilot signal checked in step (b) is included in the list of extended neighboring base stations; and (b) (iii) recognizing a handoff failure if said detected pilot signal is not included in the list of extended neighboring base stations as determined in step (b) (ii);

(b) (iv) performing an inter-cell handoff at a frequency of the detected pilot signal if said detected pilot signal is not a dummy pilot signal as determined in step (b) (ii);or (b) (v) determining a handoff frequency with reference to the extended neighboring list, performing an inter-cell and an inter-frequency handoff at said determined handoff frequency, and monitoring a paging channel if said detected pilot signal is a dummy pilot signal as determined in step (b) (ii).

12. An apparatus for an idle state handoff between base stations having different frequency assignments in a cellular system, said apparatus comprising:

a mobile telephone for detecting pilot signals transmitted from a plurality of neighboring base stations;

means for determining a frequency by said mobile telephone for the idle state handoff from a list of the plurality of neighboring base stations and from information regarding a frequency assignment of each one of the neighboring base stations;

means for performing an idle state handoff of said mobile telephone at said determined frequency while moving between base stations having different frequencies; and means for sending to a current base station by said mobile telephone the list of the neighboring base stations and information regarding the frequency assignment of the neighboring base stations.

13. The apparatus as set forth in claim 12, wherein the information regarding the frequency assignment of the plurality of neighboring base stations transmitted by a current base station includes an index of pilot pseudo-random noise offset (PILOT_PN) used in said cellular system, a configuration state of the frequency assignment of the neighboring base station (NGHBR_CONFIG) for indicating a state of the frequency assignment of the neighboring base stations, a frequency indicator to indicate whether a frequency of said mobile telephone connected to the current base station is a dummy pilot signal (FREQ_INCL), a frequency band of the frequency assignment (NGHBR_BAND), and an assigned frequency of the frequency assignment (NGHBR_FREQ) for indicating information on the frequency assignment being synchronized by said mobile telephone.

14. The apparatus as set forth in claim 12, wherein a strength of the detected pilot signal from the neighboring base station is stronger than a pilot signal of a current base station by a predetermined value.

15. The Apparatus as set forth in claim 13, wherein a strength of the detected pilot signal from the neighboring base station is stronger than a pilot signal of the current base station by a predetermined value.

16. An apparatus for an idle state handoff between base stations having frequency assignments in a cellular system, said apparatus comprising:

a mobile telephone for detecting pilot signals of a plurality of neighboring base stations and for deciding a frequency for the idle state handoff from a reference list of the neighboring base stations and information regarding a frequency assignment of detected pilot signals;

a current base station for sending to said mobile telephone the list of the neighboring base stations and the information regarding the frequency assignment of the neighboring base stations; and means for performing an idle state handoff of said mobile telephone while moving from the current base station to one of the neighboring base stations at the decided frequency.

17. The apparatus as set forth in claim 16, wherein the information regarding the frequency assignment of the plurality of neighboring base stations transmitted by the current base station includes an index of pilot pseudo-random noise offset (PILOT_PN) used in said cellular system, a configuration state of the frequency assignment of the neighboring base station (NGHBR_CONFIG) for indicating a state of the frequency assignment of the neighboring base stations, a frequency indicator to indicate whether a frequency of said mobile telephone connected to the current base station is a dummy pilot signal (FREQ_INCL), a frequency band of the frequency assignment (NGHBR_BAND), and an assigned frequency of the frequency assignment (NGHBR_FREQ) for indicating information on the frequency assignment being synchronized by said mobile telephone.

18. The apparatus as set forth in claim 16, wherein a strength of the detected pilot signal from the neighboring base station is stronger than a pilot signal of the current base station by a predetermined value.

19. The apparatus as set forth in claim 17, wherein a strength of the detected pilot signal from the neighboring base station is stronger than a pilot signal of the current base station by a predetermined value.

* * * * *